United States Patent [19]

Roller et al.

[11] Patent Number: 5,372,881
[45] Date of Patent: Dec. 13, 1994

[54] THERMOFORMABLE POLYOLEFIN SHEET

[75] Inventors: William R. Roller, Baton Rouge, La.; Lawrence Lyon, Wheaton, Ill.; Jay P. Porter, Baton Rouge, La.; Ame P. Krueger, Winter Haven, Fla.

[73] Assignee: AlliedSignal Inc., Morristown, N.J.

[21] Appl. No.: 897,188

[22] Filed: Jun. 10, 1992

[51] Int. Cl.⁵ ............................................. B32B 5/16
[52] U.S. Cl. .................... 428/339; 428/520; 428/521; 428/522; 428/517
[58] Field of Search ............... 428/516, 517, 520, 522, 428/339

[56] References Cited

U.S. PATENT DOCUMENTS

| | | | |
|---|---|---|---|
| 2,703,794 | 3/1955 | Roedel | 260/87.3 |
| 2,727,023 | 12/1955 | Evering et al. | 260/94.9 |
| 2,953,551 | 9/1960 | White | 260/86.7 |
| 2,962,487 | 11/1960 | Coover, Jr. | 260/93.7 |
| 3,050,514 | 8/1962 | Cawthon | 260/94.9 |
| 3,350,372 | 10/1967 | Anspon | 260/86.7 |
| 3,462,102 | 2/1969 | Solak et al. | 260/879 |
| 3,586,737 | 6/1971 | Duke et al. | 260/879 |
| 3,644,262 | 2/1972 | Stehle et al. | 260/29.6 R |
| 3,671,607 | 6/1972 | Lee | 260/876 R |
| 3,673,050 | 6/1972 | Newman, Jr. et al. | 260/29.6 RB |
| 3,763,278 | 10/1978 | Griffith et al. | 260/2.5 R |
| 3,900,528 | 8/1975 | Beer | 260/876 R |
| 4,035,329 | 6/1977 | Wiest et al. | 260/29.6 T |
| 4,164,489 | 8/1979 | Daniels et al. | 260/29.6 |
| 4,386,187 | 5/1983 | Grancio et al. | 525/96 |
| 4,647,509 | 3/1987 | Wallace et al. | 428/479.9 |
| 4,914,138 | 4/1990 | Percec et al. | 525/71 |
| 5,082,742 | 1/1992 | Padwa | 428/515 |

Primary Examiner—Edith Buffalow
Attorney, Agent, or Firm—Melanie L. Brown; Roger H. Criss

[57] ABSTRACT

This invention relates to a thermoformable laminate comprising a layer of polyolefin selected from the group consisting of homopolymers and copolymers of α-olefins having up to 8 carbon atoms, a layer of nitrile copolymer, and an adhesive layer interposed between the polyolefin layer and the nitrile copolymer layer.

14 Claims, No Drawings

THERMOFORMABLE POLYOLEFIN SHEET

BACKGROUND OF THE INVENTION

1. Field of the Invention

The present invention relates to thermoformable polyolefin sheets. More particularly, the present invention relates to a thermoformable polyolefin laminate that provides improved paintability and scratch resistance in addition to the inherent and desirable properties of polyolefin.

2. Description of the Prior Art

Thermoforming is a process for converting thermoplastic sheets into useful shaped articles, which is usually accomplished by heating a thermoplastic sheet above its softening point and forcing it against a mold by vacuum, air, or mechanical pressure to a shape corresponding to the mold contour. Thermoforming of high impact polystyrene (HIPS) and acrylonitrile-butadiene-styrene (ABS) copolymer sheets have been utilized extensively in various industries. For example, thermoforming refrigerator-door liners from HIPS and ABS sheets are well established practices in the home-appliance industry. Examples of other thermoformed articles made from these polymers include food-container liners, containers for dairy products, luggage and the like. However, HIPS polymers are susceptible to chemical attack by common household chemicals, and ABS copolymers are relatively expensive and are not solvent resistant.

Recent development in polyolefins have made thermoforming from prefabricated polyolefin sheets on conventional thermoforming equipments practical, and, consequently, the use of such thermoformable polyolefin sheets has increased substantially. Polyolefins are relatively inexpensive polymers that offer desirable physical properties, including good impact resistance over a wide temperature range, and good resistance to various chemicals and moisture, as well as excellent processability. However, polyolefins do not provide hard surfaces that are scratch resistant. Furthermore, polyolefins, unlike other costly engineering polymers such as polyamides and polycarbonates, do not provide aesthetically pleasing glossy surfaces. Yet another disadvantageous aesthetic property of polyolefins is that articles formed therefrom are difficult to paint since most commercially available paint formulations do not securely and durably adhere to polyolefins.

There have been many attempts in the prior art to improve undesirable properties of polyolefins. One of such attempts is disclosed in U.S. Pat. No. 4,914,138 to Percec et al. Percec et al. teaches a blend composition comprising a functionalized polyolefin and a nitrile copolymer. However, the blend composition may not be suitable for certain applications since, as is well known in the art, a blend composition not only exhibits desirable properties of the component polymers but also retains undesirable properties. Furthermore, the desirable properties of each polymers in the blend tend to be proportionally attenuated by the amount of other polymers present in the blend. Although nitrile copolymers are known for their high gas barrier properties, optical clarity and good chemical resistance, nitrile copolymers do not have desirable impact resistance, moisture barrier properties. In addition, polyolefins and nitrile copolymers are not compatible and cannot be blended to retain any useful properties unless functionalized polyolefins are used. As such, the extra processes and costs required in functionalizing the polyolefins and the subsequent blending procedures render the blend more expensive.

It is, therefore, desirable to have modified thermoformable polyolefin sheets that combine desirable properties of polyolefins and nitrile copolymers and, yet, are not substantially more expensive than unmodified thermoformable polyolefin sheets.

SUMMARY OF THE INVENTION

In accordance with the present invention there is provided a thermoformable laminate comprising a layer of polyolefin selected from the group consisting of homopolymers and copolymers of $\alpha$-olefins having up to 8 carbon atoms; a layer of nitrile copolymer comprising, based on the total weight of the nitrile copolymer, from about 90 to about 50 weight percent of an olefinically unsaturated nitrile monomer, up to about 30 weight percent of an ester of $\alpha,\beta$-ethylenically unsaturated carboxylic acid, and up to about 25 weight percent of a conjugated diene rubber; and an adhesive layer selected from the group consisting of ethylene vinyl acetate copolymers, alkyl ester copolymers of an olefin having from about 2 to about 8 carbon atoms and an alkyl ester of an $\alpha,\beta$-ethylenically unsaturated carboxylic acid, and modified polyolefin compositions having at least one functional moiety selected from the group consisting of unsaturated polycarboxylic acids and acid anhydrides, wherein the adhesive layer is interposed between the polyolefin layer and the nitrile copolymer layer.

In addition, in accordance with the present invention, there is provided processes of producing the laminate of the present invention and articles made therefrom.

DETAILED DESCRIPTION OF THE INVENTION

As mentioned above, in accordance with the present invention, there is provided a thermoformable polyolefin sheet laminated with a nitrile copolymer film, wherein the nitrile copolymer film layer is securely bound to the polyolefin sheet layer by an adhesive layer that is interposed between the two layers. The thermoformable laminate of the present invention provides a hard, glossy, and chemical and scratch resistant surface that is readily paintable as well as highly impact resistant.

The polyolefins suitable for use in conjunction with the present invention include homopolymers and copolymers of $\alpha$-olefins having about 2 to about 8 carbon atoms, such as polyethylene, polypropylene, polybutylene, ethylenepropylene copolymer and rubber modified olefinic polymers. Of these, the preferred are homopolymers and copolymers of ethylene.

The ethylene polymers suitable for the present invention includes homopolymers of ethylene as well as copolymers obtained by reacting ethylene with a small amount of one or more of comonomers. Non-limiting examples of such comonomers include $C_3$ to $C_8$ alkenes such as propylene, 1-butene, 1-pentene, 1-hexene, 2-methyl-1-propene, 4-methyl-1-pentene, and the like, as well as mixtures thereof. Generally, the copolymer contains at least 85 weight percent, and preferably not less than 96 weight percent of polymer units derived from ethylene. Of these suitable ethylene copolymers, the most preferred are ethylene copolymers containing hexene.

The preferred ethylene polymers suitable for the present invention are high density polyethylenes having a melt index, as measured in accordance with ASTM D1238-86, condition 190/2.16, from about 0.01 to about 5.0 g/10 min.

The suitable polyolefins may be produced by any conventional procedure known in the art, including slurry and gas phase processes. The suitable procedures for preparing the polyethylenes suitable for use herein include the Zeigler process, which teaches the use of an active metal alkyl catalyst, the Phillips process and processes described in U.S. Pat. Nos. 2,727,023; 3,050,514 and 3,051,993. The suitable procedures for preparing the suitable polypropylenes include conventional polymerization processes such as the process disclosed in U.S. Pat. No. 2,962,487.

The polyolefins suitable for the present invention may be further modified by filling the composition with various fillers such as mica, talc and the like, in order to provide added stiffness and higher temperature utilities, as well as with other additives, such as heat stabilizers, antioxidants and the like.

The nitrile copolymers suitable for the present invention comprises, based on the total weight of the nitrile copolymer, from about 90 to about 50 weight percent, preferably from about 85 to about 55 weight percent, more preferably from about 80 to about 60 weight percent, of an olefinically unsaturated nitrile monomer, up to about 30 weight percent, preferably up to about 25 weight percent, more preferably up to about 20 weight percent, of an ester of $\alpha,\beta$-ethylenically unsaturated carboxylic acid, and up to about 25 weight percent, preferably up to about 20 weight percent, more preferably up to about 15 weight percent, of a conjugated diene rubber.

The olefinically unsaturated nitriles useful in the present invention include acrylonitrile, $\alpha$-chloro-acrylonitrile, $\alpha$-fluoro-acrylonitrile, methacrylonitrile, ethacrylonitrile and the like, as well as mixtures thereof. The most preferred olefinically unsaturated nitrile useful in the present invention is acrylonitrile.

The esters of $\alpha,\beta$-ethylenically unsaturated carboxylic acids useful in the present invention include the esters having the structure:

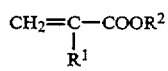

wherein $R^1$ is hydrogen, an alkyl group having from 1 to 4 carbon atoms, or a halogen and $R^2$ is an alkyl group having from 1 to 6 carbon atom. Non-limiting examples of such esters are methyl acrylate, methyl methacrylate, ethyl acrylate, ethyl methacrylate, propyl acrylates, propyl methacrylates, butyl acrylates, butyl methacrylates, hexyl acrylates and hexyl methacrylates. Of these, most preferred are methyl acrylate, methyl methacrylate, and ethyl acrylate.

The conjugated diene rubber suitable for use in accordance with the present invention are butadiene rubbers having at least 50 wt % based on the total weight of the rubber of butadiene. Suitable butadiene rubbers my contain up to 50 wt % of styrene, aforementioned olefinically unsaturated nitrile monomers, and mixtures thereof.

The nitrile copolymers suitable for the present invention can be prepared by any of the known techniques of polymerization including the bulk polymerization, solution polymerization and emulsion or suspension polymerization that forms block, random or graft copolymers. Such polymerization methods that are suitable for the present invention are disclosed in U.S. Pat. Nos. 3,426,102 to Solak et al.; 3,586,737 to Duke et al.; 3,671,607 to Lee; 3,763,278 to Griffith et al.; and 3,900,528 to Beer. The preferred polymerization method is an emulsion or suspension polymerization of the olefinically unsaturated nitrile and the ester of $\alpha,\beta$-ethylenically unsaturated carboxylic acids in the presence of a preformed conjugated diene rubber.

As is known in the art, nitrile copolymers and polyethylenes are incompatible polymers having dissimilar polarities, and, thus, an adhesive layer must be utilized in order to provide a securely bonded laminate structure. It has been found that the adhesives suitable for the present invention include modified polyolefins, such as ethylene vinyl acetate copolymers, alkyl ester copolymers of $\alpha$-olefins and $\alpha,\beta$-ethylenically unsaturated carboxylic acids, polyolefins functionalized with unsaturated polycarboxylic acids and anhydrides, and mixtures thereof.

One group of suitable adhesives for the present invention includes ethylene vinyl acetate copolymers. The preferred ethylene vinyl acetate copolymer suitable for the present invention comprises, based on the total weight of the copolymer, between about 5 and about 50 weight %, more preferably between about 10 and 40 weight %, most preferably between about 15 and about 30 weight %, of vinylacetate. Most often, ethylene vinyl acetate copolymers are made by free radical polymerization processes in a conventional stirred autoclave or a high-pressure tubular reactor. The suitable copolymers and manufacturing processes thereof are disclosed, for example, in U.S. Pat. Nos. 2,703,794 to Roedel; 3,644,262 to Stehle et al.; 4,035,329 to Wiest et al.; and 4,164,489 to Daniels et al.

Another group of suitable adhesives for the present invention includes alkyl ester copolymers of an olefin having from about 2 to about 8 carbon atoms and an alkyl ester of an $\alpha,\beta$-ethylenically unsaturated carboxylic acid. Such alkyl ester copolymers may be produced in accordance with the processes well known to the art forming random, block and graft copolymers. Those production processes include, but are not limited to, the ones described in U.S. Pat. Nos. 2,953,551 to White and 3,350,372 to Anspon.

Non-limiting examples of the alkyl ester copolymers suitable for use in the present invention include ethylene/methyl acrylate, ethylene/ethyl acrylate, ethylene/butyl acrylate, ethylene/2-ethylhexyl acrylate, ethylene/decyl acrylate, ethylene/octadecyl acrylate, ethylene/methyl methacrylate, ethylene/ethyl methacrylate, ethylene/butyl methacrylate, ethylene/2-ethylhexyl methacrylate, ethylene/decyl methacrylate, ethylene/octadecyl methacrylate, and copolymers and blends thereof. The preferred alkyl ester copolymer suitable for the present invention comprises between about 5 and about 50 weight % of the alkyl ester, based on the total weight of the alkyl ester copolymer. More preferably, the alkyl ester comprises between about 7 and about 40 weight %; most preferably, between about 10 and about 30 weight %.

Yet another group of suitable adhesive polymers includes modified polyolefin compositions having at least one functional moiety selected from the group consisting of unsaturated polycarboxylic acids and acid anhydrides. The polyolefins which may be used to form the modified reaction product of the modified polyolefin compositions suitable for the present invention include polyolefins and their copolymers, wherein the olefin monomers have between about 2 and about 8 carbon atoms. Non-limiting examples of suitable polyolefins include low, medium or high density polyethylene, linear low density polyethylene, polypropylene, polybutylene, polypentene-1, poly-3-methylbutene-1, poly-4-methylpentene-1, polyhexene-1, and copolymers and blends thereof. The modified polyolefin compositions suitable for use in conjunction with the present invention include copolymers and graft copolymers of a polyolefin and a constituent having a functional moiety selected from the group consisting of unsaturated polycarboxylic acids and acid anhydrides thereof. The unsaturated polycarboxylic acids and anhydrides include maleic acid, maleic anhydride, fumaric acid, crotonic acid, citraconic anhydride, itaconic anhydride and the like. Preferred of these are anhydrides, of which most preferred is maleic anhydride.

The preferred modified polyolefin composition comprises between about 0.001 and about 10 weight % of the functional moiety, based on the total weight of the modified polyolefin. More preferably, the functional moiety comprises between about 0.005 and about 5 weight %; most preferably, between about 0.01 and about 2 weight %.

The modified polyolefin compositions suitable for the present invention can be produced in accordance with the processes known to the art, including but not limited to the processes described in U.S. Pat. Nos. 3,481,910; 3,480,580; 4,612,155 and 4,751,270. As a suitable process, a graft polymerization reaction is generally performed by standard graft polymerization techniques known in the art. Such a process comprises heating a mixture of a polyolefin, a monomer of the functional moiety and a free radical initiator under kneading to a temperature at which polyolefin becomes molten to facilitate graft polymerization of the functional moiety. Alternatively, the above-stated compounds are dissolved or suspended in an appropriate solvent to perform the graft polymerization reaction.

The laminate of this invention may be produced by conventional methods useful in producing multilayer laminates such as by coextrusion techniques and lamination techniques. Typically, a coextruded multilayer laminate is formed by simultaneously extruding two or more of molten laminate compositions through a multimanifold die to form a multilayer extrudate and then placing the extrudate on a chill roll to be cooled. One particular advantage of coextruded laminates is in the formation of a multilayer laminate in one process step by combining molten layers of each of the layers of polyolefin sheet composition, tie adhesive composition, and nitrile copolymer composition into a unitary laminate structure. Alternatively, the laminate of the present invention can be formed from prefabricated sheet and films of each layer by melt-pressing procedures under heat as is well known in the art.

Surprisingly, it has been found that the laminate of the present invention, which is a strongly adhered unitary construction, can be fabricated by directly melt-extruding a polyolefin over a prefabricated nitrile copolymer film coated with one of the suitable adhesives of the present invention. This method of fabricating the laminate of the present invention is particularly useful since nitrile copolymer films coated with various adhesives are commercially available and widely being used in the food packaging industries, such as for use in meat and dairy product packaging.

Although each layer of the laminate structure can be of different thickness, the preferred thickness of the polyolefin sheet ranges from about 50 mils (1.3 mm) to about 500 mils (13 mm), more preferably from about 75 mils (1.9 mm) to about 400 mils (10 mm), most preferably from about 100 mils (2.5 mm) to about 250 mils (6.5 mm). The preferred thickness of the nitrile copolymer layer ranges from about 3 mils (0.08 mm) to 50 mils (1.3 mm), more preferably from about 4 mils (0.1 mm) to about 40 mils (1 mm), most preferably from about 5 mils (0.13 mm) to about 20 mils (0.5 mm). And the preferred thickness of the adhesive layer ranges up to about 4 mils (0.1 mm), more preferably up to about 3 mils (0.08 mm), most preferably up to about 2 mils (0.05 mm).

The laminate of the present invention provides sheet with excellent: thermoformability and impact resistance in addition to an aesthetically desirable glossy surface that is paintable, scratch resistant and chemical resistant. As such, the present laminate is suitable for a variety of applications including recreational and agricultural vehicle body panels, refrigerator-liners, truck-liners, camper tops and the like.

The following non-limiting examples are given to further illustrate the invention, and the invention should not be considered as being limited to the details thereof.

EXAMPLES

Example 1

A high density polyethylene copolymer having a 0.95 weight % hexene content and a 0.949 g/cm$^3$ density (BA50-100 from Paxon Polymer, Baton Rouge, La.) was extruded directly onto a nitrile copolymer film coated with an ethylene vinyl acetate to form a 125 mil (3.2 mm) thick three-layer laminate using a Davis Standard extruder- The nitrile copolymer film utilized in the example is commercially available from Milprint, Milwaukee, Wis., and is a 7 mil (0.18 mm) thick nitrile copolymer film having a 70 weight % acrylonitrile monomer content (Barex® 218, available from BP Chemicals, Inc.) coated with an ethylene vinyl acetate copolymer to a thickness of 1.5 mils (0.04 mm). The extruder which was operated at 40 rpm was equipped with 9 zones, and the sheet roll stack was equipped with 3 chrome rolls. The temperature profile of the extruder and sheet roll stack was 430° F. (221° C.) for zone 1, 440° F. (227° C.) for zone 2, 451° F. (233° C.) for zone 3, 458° F. (237° C.) for zone 4, 461° F. (238° C.) for zone 5, 455° F. (229° C.) for zone 6, 462° F. (239° C.) for zone 7, 461° F. (238° C.) for zones 8–9, 205° F. (96° C.) for top chrome roll, and 210° F. (99° C.) for middle and bottom chrome rolls.

Example 2

A laminate from Example 1 was thermoformed using an Enforcer thermoforming machine, available from AAA Plastics Equipment Inc., Texas, and a testing mold manufactured by Arborcraft, Inc., Plymouth, Minn., model # AT mold 2585. The laminate was heated to 320° F. (160° C.) and, then, was placed in the mold which was kept at 155° F. (68° C). Vacuum was applied in the mold for about 130 seconds and, then, forced air was applied for 20 seconds. Immediately, the formed part was removed from the mold.

Control 1

A 125 mil (3.2 mm) thick high density polyethylene (BA50-100 from Paxon Polymer) sheet was produced in accordance with the settings and procedures described in Example 1.

Control 2

A polyethylene sheet from Control 1 was subjected to the thermoforming procedure described in Example 2.

For Examples 1-2 and Controls 1-2, flexural modulus and flexural strength in accordance with the ASTM D-790-86 test method, gloss in accordance with ASTM D-2457-70, and hardness in accordance with ASTM D-2240-86 were measured. The results are shown in Table 1.

TABLE 1

| | Sheets | | Thermoformed Part | |
|---|---|---|---|---|
| Test | Example 1 | Control 1 | Example 2 | Control 2 |
| Flexural Modulus ($\times 10^3$ psi) | 180.7 | 140.1 | 146.4 | 97.8 |
| Flexural Strength ($\times 10^3$ psi) | 5.38 | 3.97 | 4.88 | 3.60 |
| Gloss (@ 85°) | 89.7 | 9.8 | 83.3 | 3.9 |
| Hardness (Shore D) | — | — | 74 | 65 |

The above results show that the laminate of the present invention complementarily adds flexural properties, and gloss and hardness characteristics to polyethylene sheets even when only a thin nitrile copolymer film is laminated to the polyethylene sheets. In addition, it was found that the thermoforming machine settings and procedures adapted for the polyethylene sheets did not require any modification to accommodate the laminate sheet, and that the laminates of the present invention were thermoformed well regardless of the fact that polyethylene or nitrile copolymer side of the laminate was exposed to the mold.

Example 3-8

Polyethylene plaques having only one half of one side laminated with a nitrile copolymer film were prepared in accordance with the polymer specifications and manufacturing procedures described in Example 1. A number of commercially available painting systems, as indicated in Table 2, were uniformly applied to both halves of the laminated side of the plaques to compare the paint adhesion characteristic.

Each coating of primers and paints were dried under 180° F. (82° C.) forced air heat. The cross-cut tape test in accordance with the ASTM D3359-90 (method A) test method was conducted on both laminated and non-laminated halves of the painted plaques. The test results of the paint adhesion strength were categorized into two groups: passed and failed. The test specimens that did not show any sign of peeling or removal were designated as passed. The results are shown in Table 2.

TABLE 2

| | PAINT SYSTEM | | ADHESION | |
|---|---|---|---|---|
| Sample | Primer | Paint | Laminated Side | Polyethylene side |
| 3 | U | P1 | P | F |
| 4 | U | P2 | P | F |
| 5 | U | P3 | P | F |
| 6 | — | P1 | P | F |
| 7 | — | P2 | P | F |
| 8 | — | P3 | P | F |

P: passed
F: Failed
U: MPPR44110 adhesion promoter, available from PPG Industries.
P1: UD9645 two component Urethane (black, medium to high gloss) paint system, available from PPG Industries, Inc.
P2: 11-A140A a single component (green, medium to high gloss) paint system. Available from Moline Paint and Chemical.
P3: F79 R34 acrylic urethan enamel two component (red, high gloss) paint system. Available from Sherwin Williams.

The results show that the laminate of the present invention provides an excellent paint adhesion property which could not be achieved on the polyethylene surface.

The laminates of the present invention provide complementarily improved stiffness, chemical and impact resistances, and aesthetic properties, such as gloss, and paintability over polyolefins while retaining the excellent thermoformability of polyolefin sheets.

What is claimed is:

1. A thermoformable laminate comprising:
   a) a layer of polyolefin selected from the group consisting of homopolymers and copolymers of α-olefins having up to 8 carbon atoms;
   b) a layer of nitrile copolymer comprising, based on the total weight of the nitrile copolymer, from about 90 to about 50 weight percent of an olefinically unsaturated nitrile monomer, up to about 30 weight percent of an ester of α,β-ethylenically unsaturated carboxylic acid, and up to about 25 weight percent of a conjugated diene rubber; and
   c) an adhesive layer selected from the group consisting of ethylene vinyl acetate copolymers, alkyl ester copolymers of an olefin having from about 2 to about 8 carbon atoms and an alkyl ester of an α,β-ethylenically unsaturated carboxylic acid, and modified polyolefin compositions having at least one functional moiety selected from the group consisting of unsaturated polycarboxylic acids and acid anhydrides, wherein said adhesive layer is interposed between said polyolefin layer and said nitrile copolymer layer.

2. The thermoformable laminate according to claim 1, wherein said polyolefin is selected from the group consisting of homopolymers and copolymers of ethylene, propylene, butylene, and blends thereof.

3. The thermoformable laminate according to claim 2, wherein said polyolefin is selected from the group consisting of ethylene homopolymers, and ethylene and hexene copolymers.

4. The thermoformable laminate according to claim 1, wherein said polyolefin layer has a thickness of from about 50 mils to about 500 mils.

5. The thermoformable laminate according to claim 1, wherein said olefinically unsaturated nitrile monomer is selected from the group consisting of acrylonitrile, α-chloro-acrylonitrile, α-fluoro-acrylonitrile, methacrylonitrile, ethacrylonitrile and mixtures thereof.

6. The thermoformable laminate according to claim 1, wherein said ester of α,β-ethylenically unsaturated carboxylic acid has the structure:

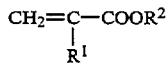

wherein $R^1$ is hydrogen, an alkyl group having from 1 to 4 carbon atoms, or a halogen and $R^2$ is an alkyl group having from 1 to 6 carbon atoms.

7. The thermoformable laminate according to claim 1, wherein said conjugated diene rubber comprises at least 50 wt % of butadiene based on the total weight of the rubber.

8. The thermoformable laminate according to claim 1, wherein said nitrile copolymer layer has a thickness of from about 3 mils to about 50 mils.

9. The thermoformable laminate according to claim 1, wherein said adhesive is an ethylene vinyl acetate copolymer.

10. The thermoformable laminate according to claim 1, wherein said adhesive is selected from the group consisting of ethylene/methyl acrylate, ethylene/ethyl acrylate, ethylene/butyl acrylate, ethylene/2-ethylhexyl acrylate, ethylene/decyl acrylate, ethylene/octadecyl acrylate, ethylene/methyl methacrylate, ethylene/ethyl methacrylate, ethylene/butyl methacrylate, ethylene/2-ethylhexyl methacrylate, ethylene/decyl methacrylate, ethylene/octadecyl methacrylate, and copolymers and blends thereof.

11. The thermoformable laminate according to claim 1, wherein said modified polyolefin is selected from the group consisting of polyolefins modified with maleic acid, maleic anhydride, fumaric acid, crotonic acid, citraconic anhydride or itaconic anhydride.

12. The thermoformable laminate according to claim 1, wherein said adhesive layer has a thickness of up to about 4 mils.

13. An article thermoformed from said thermoformable laminate according to claim 1.

14. A thermoformable laminate comprising:
a) a layer of high density polyethylene selected from the group consisting of homopolymers and copolymers high density polyethylene;
b) a layer of nitrile copolymer comprising, based on the total weight of the nitrile copolymer, from about 90 to about 50 weight percent of an olefinically unsaturated nitrile monomer, up to about 30 weight percent of an ester of $\alpha,\beta$-ethylenically unsaturated carboxylic acid, and up to about 25 weight percent of a conjugated diene rubber; and
c) an adhesive layer selected from the group consisting of ethylene vinyl acetate copolymers, wherein said adhesive layer is interposed between said polyolefin layer and said nitrile copolymer layer.

* * * * *

UNITED STATES PATENT AND TRADEMARK OFFICE
CERTIFICATE OF CORRECTION

PATENT NO. : 5,372,881
DATED : December 13, 1994
INVENTOR(S) : W.R. Roller et al.

It is certified that error appears in the above-indentified patent and that said Letters Patent is hereby corrected as shown below:

On the title page, item [73], delete " AlliedSignal Inc., Morristown, N.J." and insert --Paxon Polymer Co., Baton Rouge, LA--.

Signed and Sealed this

Fifteenth Day of August, 1995

Attest:

BRUCE LEHMAN

Attesting Officer     Commissioner of Patents and Trademarks